(12) United States Patent
Gupta

(10) Patent No.: US 11,221,856 B2
(45) Date of Patent: Jan. 11, 2022

(54) JOINT BOOTSTRAPPING MACHINE FOR TEXT ANALYSIS

(71) Applicant: Siemens Aktiengesellschaft, Munich (DE)

(72) Inventor: Pankaj Gupta, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 577 days.

(21) Appl. No.: 15/993,688

(22) Filed: May 31, 2018

(65) Prior Publication Data
US 2019/0370007 A1    Dec. 5, 2019

(51) Int. Cl.
*G06F 9/4401* (2018.01)
*G06F 16/33* (2019.01)

(52) U.S. Cl.
CPC ........ *G06F 9/4401* (2013.01); *G06F 16/3344* (2019.01)

(58) Field of Classification Search
CPC ............................ G06F 9/4401; G06F 16/3344

USPC ........................ 706/45; 704/9, 10; 705/14.49
See application file for complete search history.

(56) References Cited

U.S. PATENT DOCUMENTS

| | | | |
|---|---|---|---|
| 9,317,569 B2* | 4/2016 | Nie ......................... | G06F 16/36 |
| 10,496,752 B1* | 12/2019 | Crossley ................. | G06F 40/30 |
| 2005/0033568 A1* | 2/2005 | Yu ......................... | G06F 40/247 704/10 |
| 2007/0124291 A1* | 5/2007 | Hassan ................... | G06F 16/34 |
| 2011/0208511 A1* | 8/2011 | Sikstrom ................ | G06Q 10/04 704/9 |
| 2012/0029908 A1* | 2/2012 | Takamatsu ............ | G06F 16/345 704/9 |
| 2016/0196587 A1* | 7/2016 | Eder ..................... | G06Q 30/0276 705/14.49 |
| 2019/0026654 A1* | 1/2019 | Allen ..................... | G06N 20/20 |

* cited by examiner

*Primary Examiner* — Ruay Ho
(74) *Attorney, Agent, or Firm* — Schmeiser, Olsen & Watts, LLP

(57) ABSTRACT

Present invention concerns a method of relation extraction from a text corpus, the method comprising extracting instances from the text corpus based on seeds, wherein the seeds include at least one set of template seeds and at least one set of entity seeds. The invention also pertains to related devices and methods.

21 Claims, 1 Drawing Sheet

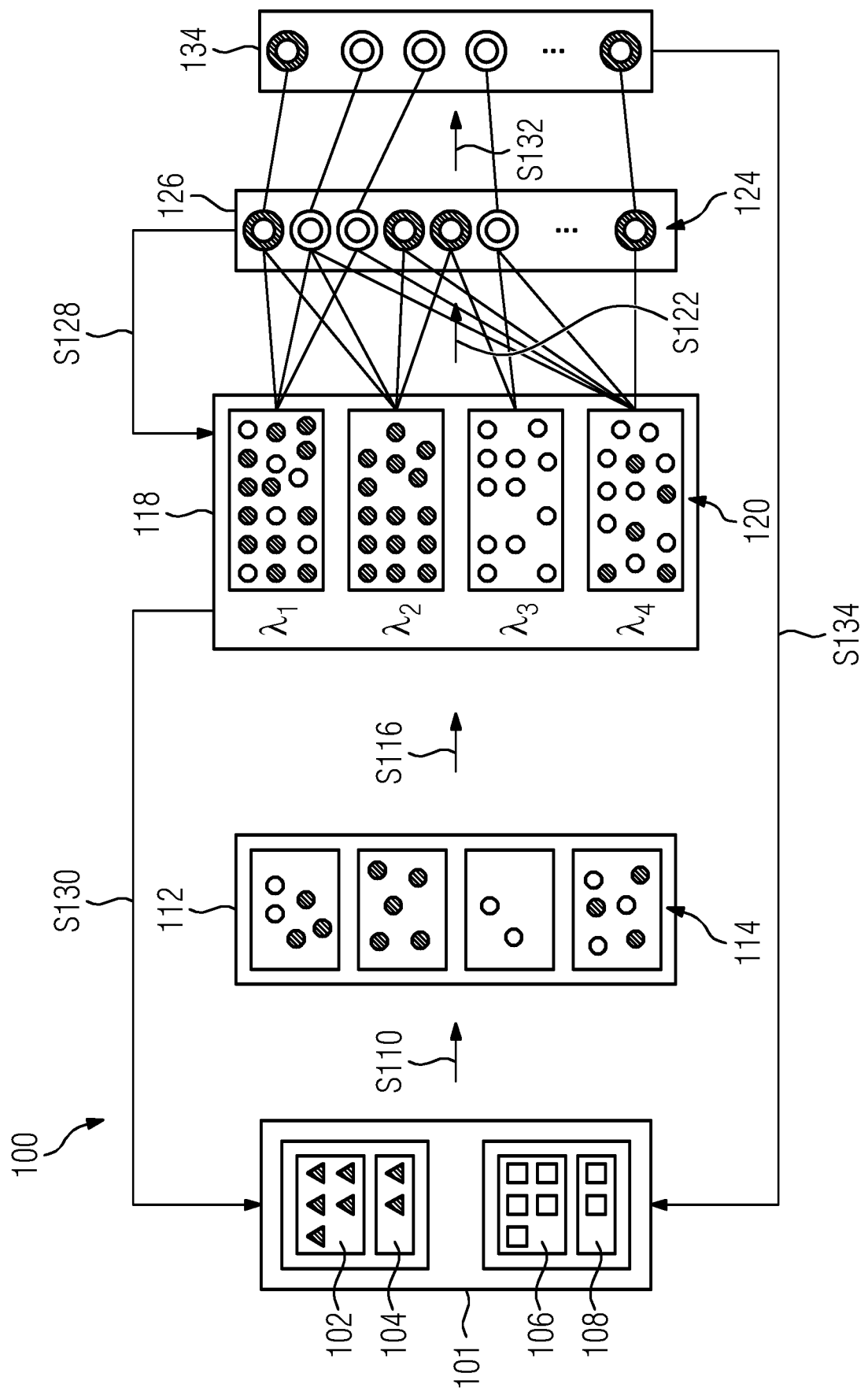

JOINT BOOTSTRAPPING MACHINE FOR TEXT ANALYSIS

FIELD OF TECHNOLOGY

Present invention concerns systems and methods for relation extraction in the context of automatic text analysis, e.g. semantic text analysis and/or information retrieval and/or Natural Language Processing (NLP).

BACKGROUND

Relation extraction is an important task in the context of automatic text analysis. Abstractly, relation extraction may be considered to be the task of discovering n-tuples of relevant items belonging to an n-ary relation in natural language documents. For example, given a relationship "x acquires y", the task could be to extract pairs of entities from a corpus for which the relationship is true. Reliable relation extraction is challenging, in particular since relationship may be described with different wording, e.g. "x obtains y", "y is acquired by x", or "the acquisition of x by y".

SUMMARY

It is an object of the present invention to provide improved approaches for relation extraction, in particular for bootstrapping and/or for methods operating on seeds.

There is disclosed a method of relation extraction from a text corpus. The method comprises extracting instances from the text corpus based on seeds, wherein the seeds comprise at least one set of template seeds and at least one set of entity seeds. By combining sets of template seeds and entity pair seeds, relation extraction may be improved, in particular in terms of reliability and improved hit rate with seeds. The relation extraction may generally be based on bootstrapping. A set of seeds may comprise positive seeds or negative seeds, or both. In some cases, there is provided a set of positive entity seeds, a set of negative entity seeds, a set of positive template seeds, and a set of negative template seeds. The sets of entity seeds and sets of template seeds may be subsets of a set of positive and negative entity seeds and a set of positive and negative template seeds.

Instances may be extracted based on a similarity metric. A similarity metric may generally measure a similarity between entities, and/or items, in particular items of the same type, and/or items and clusters. A cluster may generally be considered a set of instances or items, which may be clustered based on metric and/or associated threshold.

It may be considered that instances are extracted iteratively. Iterative extraction may generally be considered to comprise, for one iteration, to perform extraction based on instances extracted in an earlier iteration. Iterative extraction may represent bootstrapping. Different iterations may pertain to different hops, or to iterations of a series of hops.

In general, instances may be extracted from the text corpus based on reliability determined for a cluster of instances. Reliability may be determined in relation to seeds, e.g. in terms of numbers of matches with seeds.

The method may comprise a plurality of successive hops, wherein for each hop after a first hop, instances are extracted from the text corpus based on instances extracted in a previous hop. Instances may be clustered for a hop, in particular for a first and/or second hop.

There is also disclosed a text analysis system for relation extraction from a text corpus. The system is adapted for extracting instances from the text corpus based on seeds, wherein the seeds comprise at least one set of template seeds and at least one set of entity seeds.

The system may be adapted for extracting instances based on a similarity metric.

In some variants, the system may be adapted for extracting instances iteratively.

It may be considered that the system is adapted for extracting instances from the text corpus based on reliability determined for a cluster of instances.

In general, the system may be adapted for a plurality of successive hops, wherein the system is adapted for extracting, for each hop after a first hop, instances from the text corpus based on instances extracted in a previous hop.

Additionally, there may be considered a computer program comprising instructions causing a computer system to perform and/or control a method as disclosed herein, for example when executed by, or run on, the computer system, for example processing circuitry thereof.

A storage medium storing a computer program as described herein may be considered.

A system may be implemented in software and/or hardware and/or firmware. The system may comprise one or more devices, and/or may be implemented with distributed functionality.

The method may especially be carried out, completely or in part, by a computer system. To this end, the method may be formulated as a computer program product (non-transitory computer readable storage medium having instructions, which when executed by a processor, perform actions) with program code means. The above described system may comprise the computer system. Advantages or features of the method may apply to the system and vice versa.

BRIEF DESCRIPTION

The above-described properties, features and advantages of present invention as well as the way they are achieved will be made clearer and better understandable in the light of the following discussion, making reference to exemplary embodiments shown in the accompanying FIGURE, in which FIG. 1 shows a diagram of an exemplary approach to bootstrapping according to an embodiment of the invention.

DETAILED DESCRIPTION

In this disclosure, it may be considered that arguments of a relationship may be typed, e.g. x and y may be organizations. It may be assumed that each entity of a text corpus that is a candidate is labeled and/or typed, e.g. by preprocessing, for example running a suitable labeling or typing algorithm on the text corpus. An entity may be represented by a word and/or term and/or phrase, which may be of a type of entity that may fulfil the relationship. In the following, an entity may be considered a typed entity, such that it may be associated to a type. An entity pair may be may be considered an example of sets {x, y} of typed entities. In general, for extraction it may be considered to extract entity pairs instead of an ordered pair (x, y). For a particular sentence that states that a relationship holds between x and y, a template may be defined, which may represent the context of x and y. The template may comprise, or consist of, three vectors $v_{-1}$, $v_0$ and $v_1$. $v_{-1}$ may represent the context before x, $v_0$ the context between x and y, and $v_1$ the context after y. Each vector may represent sums of embeddings of corresponding words. A template may be considered typed, such that it may specify the types of x, y. An instance may be considered a combination of an entity pair and a template, wherein the types of entity pair and template may be the same. The term item may be used to refer to an entity pair or template, or both, or an instance. A seed may represent a specific entity pair, or template, or instance, and may be considered examples fulfilling a relationship, for positive seeds, or examples not fulfilling a relationship for negative seeds.

Bootstrapping may generally comprise automatically extracting iteratively instances of a relationship from a text corpus, utilising seeds. For example, a set g may be extracted. Instances may be referred to as i or j. x(i) is the entity pair of instance i, and t(i) the corresponding template. Relation extraction may generally pertain to identifying, for a text corpus, texts or parts of a texts, or entities or items in a text, that fulfil a relation. Extracting may comprise providing and/or storing and/or displaying such if identified. The relation may be a linguistic relation, defining a relation between entities, which may be typed.

A text corpus may comprise one or more texts or documents, which may be stored in a storage, e.g. a memory arrangement, which may comprise one or more memories. A text analysis system may comprise and/or be connected to such a storage, e.g. for reading text. A text may comprise one or more sentences, each of which may comprise one or more words. Seeds may generally be provided by input and/or read from storage.

FIG. 1 shows an exemplary text analysis system 100, which is represented by a bootstrapping arrangement implemented as Joint Bootstrapping Machine (JBM) 100. Seeds $G_s$ 101 are provided, e.g. via input and/or in a storage or memory. In particular, there may be provided positive seeds $G_{Ep}$ 102 and negative seeds $G_{En}$ 104 for entity pairs, as well as positive seeds $G_{Tp}$ 106 and negative seeds $G_{Tn}$ 108 for templates. A positive seed may indicate an example of an item that fulfils a relation, a negative seed may indicate an example of item that does not fulfil a relation. The positive seeds may be referred to as Gp, the negative seeds as Gn.

In an action S110 associated to a first hop 118, also referred to as hop-1, occurrences of instances similar to a seed item in a text corpus may be determined and/or collected, e.g. based on the seeds Gs and/or a similarity metric. A similarity metric may measure similarity for items, in particular instances. Instances may be clustered, e.g. based on a clustering metric, which may pertain to entity pairs and/or templates and/or instances, or more generally, to items. A cluster is indicated with a dashed line. Depending on the application, different numbers of clusters may occur. Clustering may be such that each cluster may comprise instances within a similarity range or with a threshold similarity based on the clustering metric. Thus, in different clusters there may be different instances which may be considered similar to each other, instances in different clusters may be considered less or not similar to each other. Clustering may be based on seed items.

A cluster may comprise instances generated due to seed entity pairs, due to templates, or both. Similarity metric and clustering metric may be related to each other or be the same, or they may be different. The clusters with instances of the first hop 112 may be considered seed occurrences O 114. In an action 116, for a second hop 118, also referred to as hop-2, extractors may be generated based on the seed occurrences O 114, which may be clustered as well. For the second hop, all instances within a similarity range or threshold $t_{sim}$ of a hop-1 instance, in the seed occurrences, are added, such that each of these instances is added to one of the clusters, the closest one according to a clustering metric.

Each cluster of hop-2 118 may be referred to as extractor, in the example shown in FIG. 1 there are four extractors $\lambda_1, \lambda_2, \lambda_3, \lambda_4$. The set of extractors may be referred to as extractors $\lambda$ 120. In an action S122 for a third hop 126, also referred to as hop-3, all instances that are within a similarity range or threshold $t_{sim2}$ are added, wherein $t_{sim}$ and $t_{sim2}$ may be equal or different. In hop-3 126, candidate instances 124 are provided. It may be considered that the candidate instances 124 comprise all instances that can be reached with three hops from a seed. For hop-3, an action S128 performing a confidence computation for each extractor and/or candidate instance may be considered. For example, a confidence of an extractor $\lambda_k$ for an instance i may be determined for one or more, or all candidate instances. The confidence may be represented, e.g., based on a product of an overall reliability of the extractor $\lambda_k$ and the similarity of instance i to the extractor $\lambda_k$. Hence it may be avoided to extract from a cluster that is distant from all its members. A confidence or reliability of a cluster or extractor may be independent of i, and may be based on the number $N_+(\lambda, Gn)$ of instances in $\lambda$ that match a negative seed and/or the number $N_+(\lambda, Gp)$ of instances that match a positive seed, respectively, e.g. represented by or based on a ratio or relation of those numbers. In particular, the confidence or reliability may be such that it is low if the chance of likely false positive extraction is high, and high if the chances for false positive extractions are low.

It should be noted that the clusters of different hops there may be included instances similar to positive seeds, and such that are similar to negative seeds, and the latter may lead to false positives. It should be noted that the reliability is exemplary determined for extractors $\lambda$, respectively for hop-2 clusters. The ratio of matching instances may be determined based on instances that match a gold seed, e.g. a seed item originally provided.

Which instances or items in a cluster or extractor match such a seed may be determined in an action S130. An action S132 may be performed to extract, based on extractor reliability, from the candidate instances 124 output instances 134. The output instances 134 may be extracted based on a confidence threshold for each candidate instance, which in turn may be determined based on reliability of the extractors. In an action S134, the output instances may be fed back to augment the seeds Gs. Another iteration based on the augmented seeds Gs may be performed. In general, a number K of iterations may be considered for bootstrapping, which may be selected based on the similarity threshold/s used.

A metric in general may be defined between items, in particular between entity pairs or templates, and/or instances. Metrics between items and clusters may be defined, e.g. based on a metric between items. For example, a similarity, or distance, between an item and a cluster in an item-to-cluster metric may be defined as the maximum similarity, or maximum distance, between the item and the items in the cluster. Reliability and confidence of an instance may be considered as metrics derived from a similarity metric, and/or as examples of cluster-metric and item-to-cluster metric, respectively. Instances may be instances occurring in a text and/or text corpus on which relation extraction is to be performed. Items and/or clusters may be considered similar based on an associated similarity metric, e.g. in relation to an associated similarity threshold.

The similarity and/or clustering metrics for different hops may be the same or different. In some variants, the same similarity metric is used throughout the bootstrapping, e.g.

for finding instances and/or clustering. However, solutions with variable metric may be considered.

Any module or functionality or action described herein may be implemented in software, e.g. as a program module or separate program interacting with another program. A system may generally comprise processing circuitry and/or one or more interfaces and/or memory. It may be considered that a system is implemented as or on a computer, and/or a dedicated analysis device. Processing circuitry may comprise integrated circuitry, e.g. one or more processors and/or controllers, e.g. microcontrollers, and/or one or more FPGAs (Field-Programmable Gate Array) and/or ASICs (Application-Specific Integrated Circuitry). The processing circuitry may comprise, and/or be connected or connectable to one or more memories and/or storage media, e.g. for reading and/or writing and/or accessing data. Processing circuitry may be located on one device, or be distributed. A memory or storage medium may be magnetic and/or optical and/or electrical and/or volatile and/or non-volatile. Examples of memories or storage media comprise flash memory, read-only memory, random access memory, CD/DVD/BlueRay, cache memory, buffer memory, etc. Even though present invention has been illustrated and explained in detail above with reference to the preferred embodiments, the invention is not to be construed as limited to the given examples. Variants or alternate combinations of features given in different embodiments may be derived by a subject matter expert without exceeding the scope of present invention.

The invention claimed is:

1. A method of relation extraction, the method comprising:
    providing a text corpus, the text corpus including a plurality of entities represented by at least one of a word, term, and phrase, at least one entity pair including a set of entities of the plurality of entities, and a plurality of templates representing the context of the at least one entity pair,
    extracting, by a processor of a computing system, instances from the text corpus based on seeds, wherein the seeds comprise at least one set of template seeds and at least one set of entity seeds, wherein instances are extracted iteratively using at least a first hop, a second hop, and a third hop, wherein the second hop uses instances extracted from the first hop as second seeds for the second hop, wherein the second hop generates a set of extractors based on the second seeds, wherein the third hop uses the set of extractors to generate candidate instances, and wherein the third hop includes performing a confidence computation for each candidate instance.

2. The method according to claim 1, wherein instances are extracted based on a similarity metric.

3. The method according to claim 1, wherein output instances are extracted from the candidate instances based on reliability of a respective extractor of the set of extractors.

4. The method according to claim 3, wherein the output instances are fed back to augment the seeds.

5. The method according to claim 1, wherein instances are extracted from the text corpus based on reliability determined for a cluster of instances.

6. The method according to claim 1, wherein the seeds comprise positive seeds that fulfil a relation and negative seeds that do not fulfil the relation.

7. The method according to claim 1, wherein the template comprises a first vector representing a context before a first entity of a respective entity pair, a second vector representing a context between the first entity of the respective entity pair and a second entity of the respective entity pair, and a third vector representing a context after the second entity of the respective entity pair.

8. The method according to claim 1, wherein the template is typed.

9. A text analysis system for relation extraction from a text corpus, the system being adapted for extracting instances from the text corpus based on seeds, wherein the seeds comprise at least one set of template seeds and at least one set of entity seeds, wherein the text corpus includes a plurality of entities represented by at least one of a word, term, and phrase, at least one entity pair including a set of entities of the plurality of entities, and a plurality of templates representing the context of the at least one entity pair, and wherein the text analysis system is adapted to iteratively extract instances using at least a first hop, a second hop, and a third hop, wherein the second hop uses instances extracted from the first hop as second seeds, wherein the second hop generates a set of extractors based on the second seeds, wherein the third hop uses the set of extractors to generate candidate instances, and wherein the third hop includes performing a confidence computation for each candidate instance.

10. A system according to claim 9, the system being adapted for extracting instances based on a similarity metric.

11. The system according to claim 9, wherein output instances are extracted from the candidate instances based on reliability of a respective extractor of the set of extractors.

12. The system according to claim 9, the system being adapted for extracting instances from the text corpus based on reliability determined for a cluster of instances.

13. The system according to claim 9, wherein the output instances are fed back to augment the seeds.

14. The system according to claim 9, wherein the seeds comprise positive seeds that fulfil a relation and negative seeds that do not fulfil the relation.

15. The system according to claim 9, wherein the seeds comprise positive seeds that fulfil a relation and negative seeds that do not fulfil the relation.

16. The system according to claim 9, wherein the template comprises a first vector representing a context before a first entity of a respective entity pair, a second vector representing a context between the first entity of the respective entity pair and a second entity of the respective entity pair, and a third vector representing a context after the second entity of the respective entity pair.

17. A computer program comprising instructions causing a processor of a computer system to perform and/or control a method of relation extraction from a text corpus, the method comprising:
    extracting, by the processor, instances from the text corpus based on seeds, wherein the seeds comprise at least one set of template seeds and at least one set of entity seeds, wherein the text corpus includes a plurality of entities represented by at least one of a word, term, and phrase, at least one entity pair including a set of entities of the plurality of entities, and a plurality of templates representing the context of the at least one entity pair, wherein instances are extracted iteratively using at least a first hop, a second hop, and a third hop, wherein the second hop uses instances extracted from the first hop as second seeds, wherein the second hop generates a set of extractors based on the second seeds, wherein the third hop uses the set of extractors to generate candidate instances, and wherein the third hop includes performing a confidence computation for each candidate instance.

18. A storage medium storing a computer program according to claim 17.

19. The computer program according to claim 17, wherein the seeds comprise positive seeds that fulfil a relation and negative seeds that do not fulfil the relation.

20. The computer program according to claim 17, wherein the template comprises a first vector representing a context before a first entity of a respective entity pair, a second vector representing a context between the first entity of the respective entity pair and a second entity of the respective entity pair, and a third vector representing a context after the second entity of the respective entity pair.

21. The computer program according to claim 17, wherein the template is typed.

\* \* \* \* \*